United States Patent [19]

Cantrell et al.

[11] 4,053,884
[45] Oct. 11, 1977

[54] HIGH PRF UNAMBIGUOUS RANGE RADAR

[75] Inventors: Ben H. Cantrell, Springfield, Va.; Bernard L. Lewis, Oxon Hill, Md.

[73] Assignee: The United States of America as represented by the Secretary of the Navy, Washington, D.C.

[21] Appl. No.: 670,816

[22] Filed: Mar. 26, 1976

[51] Int. Cl.$^2$ ............................ G01S 7/28; G01S 9/42
[52] U.S. Cl. ............................... 343/7.7; 343/17.2 PC
[58] Field of Search ............................ 343/17.2 PC, 7.7

[56] References Cited

U.S. PATENT DOCUMENTS

| | | | |
|---|---|---|---|
| 3,363,248 | 1/1968 | Nicodemus | 343/17.2 PC |
| 3,968,490 | 7/1976 | Gostin | 343/7.7 |

*Primary Examiner*—Maynard R. Wilbur
*Assistant Examiner*—Richard E. Berger
*Attorney, Agent, or Firm*—R. S. Sciascia; Philip Schneider; David G. Rasmussen

[57] ABSTRACT

A pulse-compression MTI doppler radar system includes an antenna, a transmitter, a coded modulator, a receiver and a display. The coded modulator is connected to the transmitter and has at least two waveform generators for coding pulses having low cross-correlation. A pulse-compression filter having at least two pulse compressors for providing pulse compressed signals is connected to the receiver. Each pulse compressor is matched autocorrelatively to a different one of the waveform generators. An MTI processor has two MTI processing channels which are responsive to the pulse-compressed signals and provide an output to the display.

3 Claims, 2 Drawing Figures

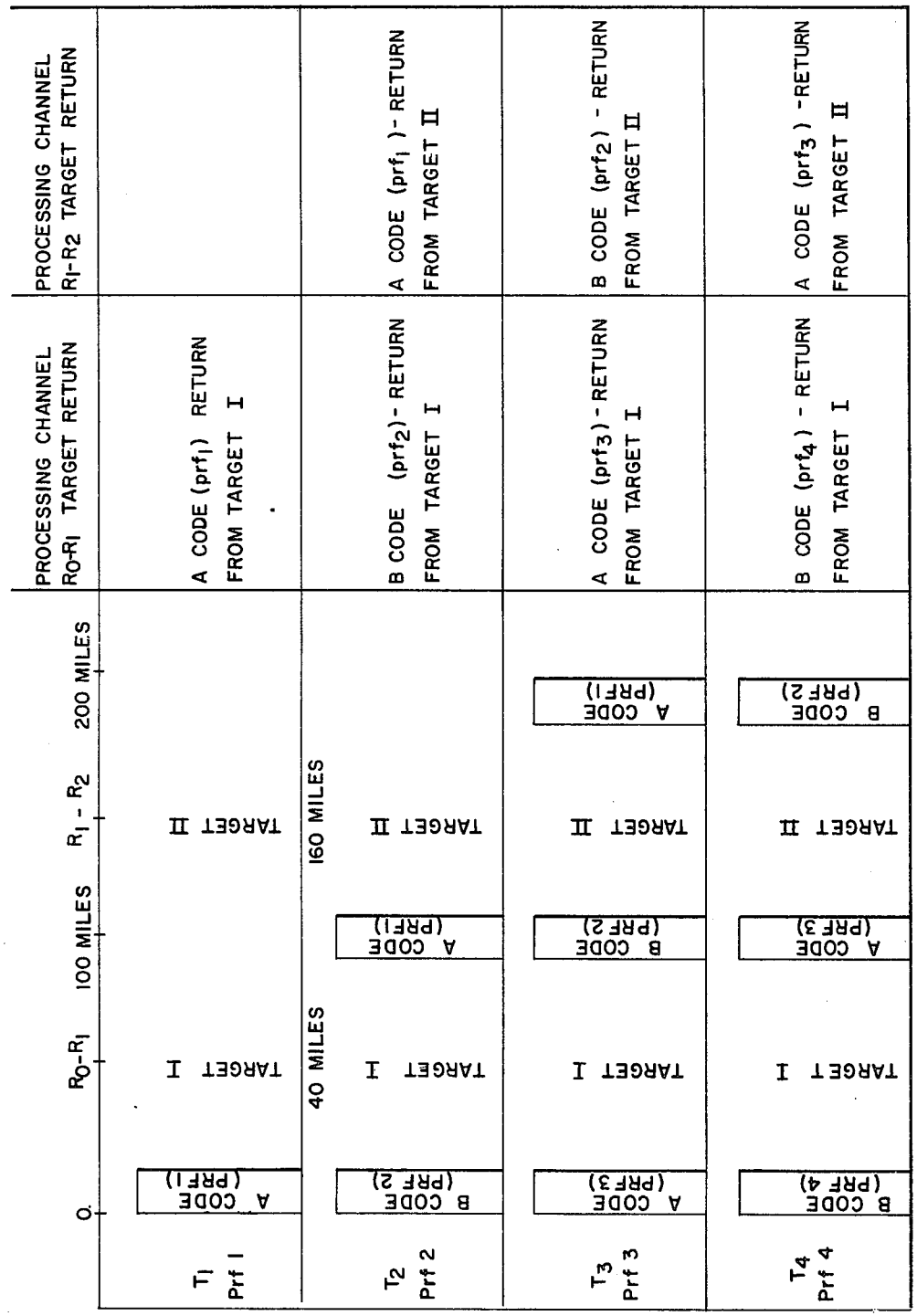

HIGH PRF UNAMBIGUOUS RANGE RADAR

BACKGROUND OF THE INVENTION

1. Field of the Invention

The invention relates to a pulse-compression-type MTI doppler radar system capable of operating at a high prf and not introducing range ambiguities. More particularly, the invention relates to apparatus for transmitting a train of pulses alternately coded with at least two codes, auto-correlating the target return of each coded pulse with pulse compressors matched to each code, and processing the pulse-compressed target returns with at least two MTI processing channels each of which will process target returns from one range segment of the operable radar range.

2. Description of the Prior Art

In pulse-compression MTI doppler radar systems the prf at which pulses are transmitted is an important parameter. On one hand, it is desirable to have a long time interval between pulses, since a transmitted pulse must have the opportunity to travel to and from a target before another pulse is transmitted or ambiguities in target range result. On the other hand, it is desirable to have a short time interval between pulses since this increases the upper limit of the target blind speed. The target blind speed determines the maximum target speed that can be detected without target speed ambiguity.

The typical pulse-compression MTI doppler radar system in the prior art is composed of a prf generator, a wave-form generator, a transmitter, an antenna, a receiver, a pulse compressor, an MTI processor, and a display. Such a system is constrained by the above-described prf tradeoff. Methods of resolving the tradeoff exist such as transmitting pulse bursts at various prfs and using the Chinese remainder theorem. It is also known in prior art not involvng pulse-compression radar systems to sequentially transmit several double sideband waveforms separated in frequency so that ranges may be separated. In the receive mode the ranges are separated by filtering the sidebands appropriately. However, for a number of reasons these solutions have proved unsatisfactory. What is needed is an improved pulse-compression MTI doppler radar system capable of operating at a high prf to maintain a high upper limit on target blind speed, and yet still be capable of operating without range ambiguities at the operable radar range.

SUMMARY OF THE INVENTION

The present invention provides an improved pulse-compression MTI doppler radar system for maintaining a high prf and having the capability of operating without range ambiguities. In brief, the present invention is similar to the previously-described prior art pulse-compression MTI doppler radar system but differs in the use of two or more each of waveform generators, pulse compressors, and MTI processing channels (and required multiplexing) rather than one of each as in the prior art. More specifically, the improved radar system includes an antenna, a transmitter, a receiver, and a display. A coded modulator is connected to the transmitter and has at least two waveform generators, which alternately code pulses with different codes having a low cross-correlation. Such pulses are then transmitted. A pulse compression filter, having at least two pulse compressors, is connected to the receiver. The pulse compressors are matched autocorrelatively to the waveform generators. As target returns from each of the coded pulses are received, the pulse compressors autocorrelate the returns. The pulse-compressed target return signals are fed to an MTI processor having at least two MTI processing channels. Each processing channel will process the target return signals from one range segment of the operable radar range to provide range, speed, and other information to the display. By transmitting and processing two channels of information on different codes, the prf of the radar system may be doubled. If more channels of information are used, the prf may be increased by the multiple of the number of channels used.

BRIEF DESCRIPTION OF THE DRAWINGS

FIG. 2 is a diagrammatic view of time versus distance plots showing the propagation of transmitted coded pulses at successive time intervals and their respective target return signals.

BRIEF DESCRIPTION OF THE PREFERRED EMBODIMENT

Figure 1:
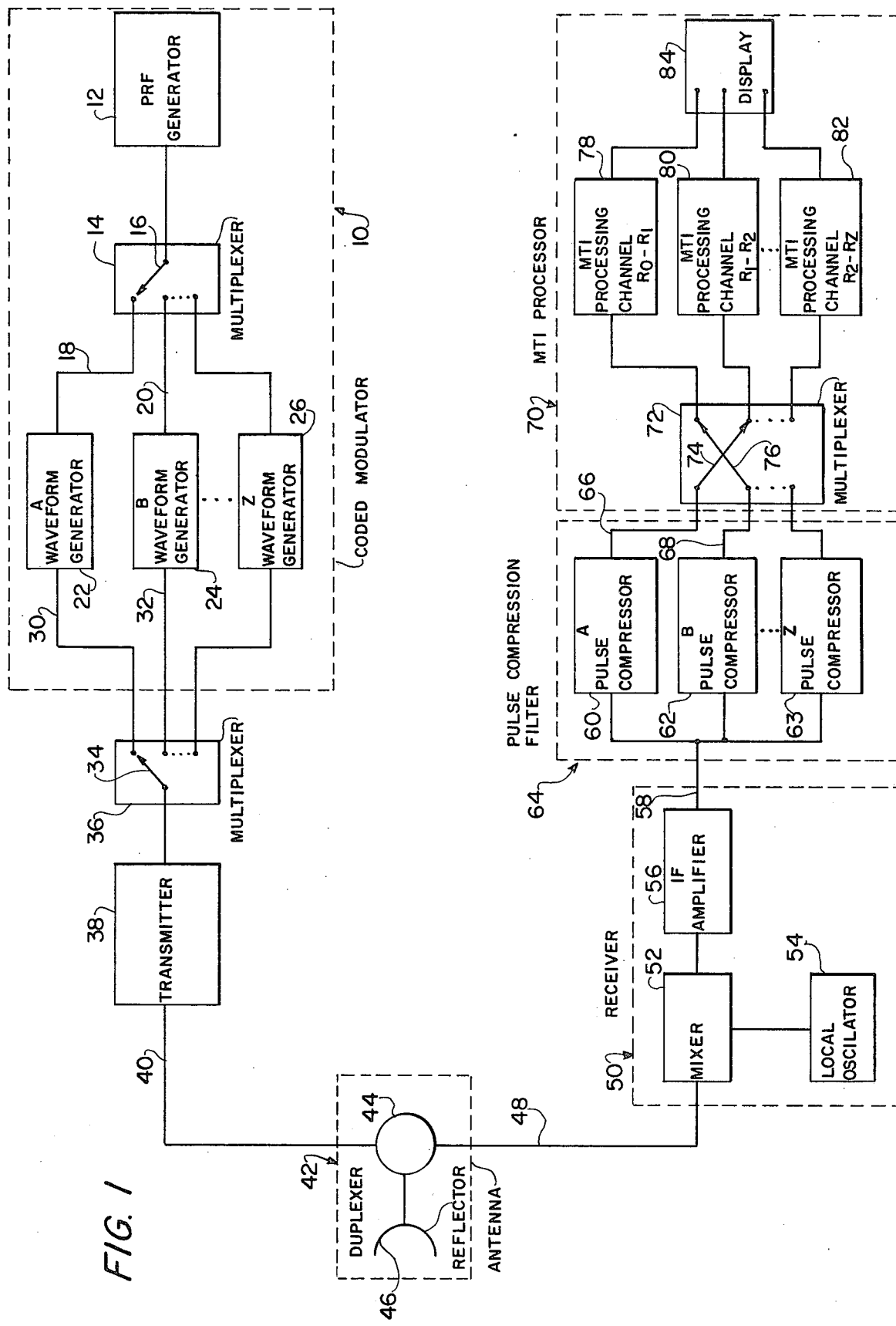
FIG. 1 is a block diagram representation of a pulse-compression MTI doppler radar system utilizing multiple waveform generators, pulse compressors, and MTI processing channels.

A pulse-compression MTI doppler radar system utilizing multiple waveform generators, pulse compressors, and MTI processing channels to resolve range ambiguities is outlined in FIG. 1. A coded modulator 10 contains a conventional prf generator 12 connected to a multiplexer 14 containing switch 16 which provides pulses alternately through lines 18 and 20 to A and B waveform generators 22,24, respectively. In MTI doppler radar systems generally, the pulses are provided at a rate of 100 to 2000 pulses per second. A and B waveform generators 22,24 are of a standard type such as that described in "Radar Design Principles," by F. E. Nathanson (1969), pp 490,491, Chapter 3. A waveform generator 22 generates an A code pulse which has a low cross-correlation with a B code pulse generated by B waveform generator 24. A discussion of phase coded pulse-compression techniques and the selection of optimum coding is provided at pages 497 and 498 of "Introduction to Radar Systems" by Skolnik (1962). Although the invention for simplicity purposes is described as having two waveform generators, additional waveform generators up to a quantity designated as Z waveform generator 26 may be used.

A and B waveform generators 22,24 are connected through lines 30 and 32, respectively, to multiplex switch 34 of multiplexer 36. Switch 34 is connected to transmitter 38 which is in turn connected through line 40 to antenna 42, containing duplexer 44 and reflector 46.

Target return signals are received by antenna 42 which is connected through line 48 to receiver 50 which contains mixer 52, local oscillator 54, and IF amplifier 56. Transmitter 38, antenna 42, and receiver 50 are all conventional radar components such as described in "Introduction to Radar Systems" by Skolnik (1962), page 493. Amplifier 56 is connected through line 58 to A pulse compressor 60 and B pulse compressor 62 of pulse compression filter 64. A and B pulse compressors 60,62 are of a conventional type as described in "Radar Design Principles" by F. E. Nathanson (1969), page 320. A pulse compressor 60 is matched to A waveform generator 22 such that the A code pulse target returns autocorrelate optimally in A pulse compressor 60. In the same manner B pulse compressor 62 is matched to B waveform generator 24. Z pulse compressor 63 represents the additional pulse compressor(s) that would be required if the quantity of waveform generators designated Z waveform generator 26 were used. A and B pulse compressors 60,62 are connected via lines 66 and 68, respectively to MTI processor 70. Multiplexer 72 directs pulse compressed signals via switches 74 and 76 to either MTI processing channel ($R_0$-$R_1$) 78 (hereinafter processing channel 78), or to MTI processing channel ($R_1$-$R_2$) 80 (hereinafter processing channel 80). MTI processing channel $R_2$-$R_Z$, 82, represents the additional channels in the system that would be used if more than two waveform generators and pulse compressors were used. $R_0$-$R_2$ designates the operable range of the radar, with $R_0$-$R_1$ representing the first half-segment of the operable range and $R_1$-$R_2$ representing the second half-segment of the operable range. Multiplexer 72 directs all A and B code pulse-compressed signals from targets in the range $R_0$-$R_1$ to processing channel 78. Similarly all A and B code pulse-compressed signals from targets in the range of $R_1$-$R_2$ are directed to processing channel 80. To accomplish this, switches 74 and 76 change positions each time a prf pulse is generated by prf generator 12. Processing channels 78 and 80 calculate target range and speed information and pass it to display 84.

FIG. 2 shows diagrammatically the transmission of each A or B coded prf pulse and the distance it propagates before a succeeding pulse is transmitted. Also shown are the target return signals from targets I and II for each A or B code pulse transmitted. At time $T_1$, and A code pulse representing $prf_1$, is transmitted. In the succeeding time interval between $T_1$ and $T_2$, the A code signal is returned from target I and passed to processing channel 78. At $T_2$, a B code pulse representing $prf_2$ is transmitted and the A code ($prf_1$) pulse is at the 100 mile mark. In the succeeding time interval between $T_2$ and $T_3$ target returns from the A code ($prf_1$) pulse striking target II and the B code ($prf_2$) pulse striking target I are received at processing channels 80 and 78, respectively. Similarly, at times $T_3$ and $T_4$ A code ($prf_3$) and B code ($prf_4$) pulses are transmitted. In the intervals following times $T_3$ and $T_4$ the A code ($prf_3$) and B code ($prf_4$) target returns are received at processing channel 78 and the B code ($prf_2$) and A code ($prf_3$) target returns are received at processing channel 80. The operable radar range of 200 miles and the number of pulses transmitted are shown for illustration purposes. The actual operable radar range and number of transmitted pulses will vary with the particular radar system.

In operation, prf generator 12 generates a train of pulses. The first pulse $prf_1$, generated at $T_1$, is directed by switch 16 through line 18 to A waveform generator 22 which generates an A code pulse. The A code pulse is fed by line 30 through switch 34 into transmitter 38. The latter transmitter modulates the A code pulse to RF and feeds the signal to antenna 42 for transmission.

During the time interval between $T_1$ and $T_2$, the A code ($prf_1$) pulse is propagating toward the 100 mile mark. At a range of 40 miles target I is present and a target return from the A code ($prf_1$) pulse is returned to antenna 42. The A code ($prf_1$) target return is fed through line 48 to receiver 50 where it is reduced to an IF signal. The signal is then fed simultaneously to A pulse compressor 60 and B pulse compressor 62. Autocorrelation occurs in A pulse compressor 60 and a short pulse is fed to line 66. No autocorrelation occurs in B pulse generator 62 and there is no output fed to line 68. Switch 74 is in the position shown as open and will direct the compressed pulse from line 66 to processing channel 78. A single pulse is insufficient information for processing channel 78 to calculate MTI information so processing channel 78 must store the pulse and wait for an additional pulse.

At time $T_2$, the second pulse, $prf_2$, is directed through switch 16 in the position shown as open, through line 20 to B waveform generator 24 which generates a B code pulse. The B code pulse is fed through transmitter 38 to antenna 42 for transmission.

During the interval between time $T_2$ and $T_3$ the A code ($prf_1$) pulse propagates beyond the 100 mile mark toward the 200 mile mark. Simultaneously the B code ($prf_2$) pulse propagates toward the 100 mile mark. The B code ($prf_2$) pulse sees a target at 40 miles and returns a B code ($prf_2$) signal to antenna 42. A short time later the A code ($prf_1$) pulse sees a target at 160 miles and return an A code ($prf_1$) signal to antenna 42.

The B code ($prf_2$) target return from target I is processed through receiver 50 and is fed through line 58 simultaneously to A and B pulse compressors 60,62 respectively. Autocorrelation occurs in B pulse compressor 62 and a short pulse is fed to line 68. No autocorrelation occurs in A pulse compressor 60 and no output is fed to line 66. Switches 74 and 76 change positions after transmission of the B code ($prf_2$) pulse and are in the positions shown. Note that the correct range information from A and B pulse compressors 60,62 for ranges $R_0$-$R_1$ and $R_1$-$R_2$ is fed to the proper processing channels 78,80 by switching switches 74,76 after the transmission of each prf pulse. The compressed pulse from line 68 is fed to processing channel 78. At this time processing channel 78 has received the A code ($prf_1$) and B code ($prf_2$) target returns from Target I. Processing channel 78 now has the required two target returns to compute range, speed, and other information required. The output of processing channel 78 is fed to display 84.

The A code ($prf_1$) target return from target II is processed through receiver 50 and fed to A and B pulse compressors 60 and 62 where autocorrelation occurs in A pulse compressor 60 and a pulse is placed on line 66. The pulse is fed from line 66 via switch 74 in the position shown, to processing channel 80. The latter processing channel 80 has received only one target return, A code ($prf_1$) from target II and hence cannot compute any range, speed or other data yet. To obtain the second pulse, processing channel 80 must wait until the time interval between $T_3$ and $T_4$ when the B code ($prf_2$) pulse propagates out to target II and returns a second target return to be processed by processing channel 80.

The preceeding sequence of alternately transmitting A and B coded prf pulses continues with the transmission of A code ($prf_3$) at $T_3$ and B code ($prf_4$) at line $T_4$ and will continue until transmission of pulses is terminated. Likewise, in the time intervals following $T_3$ and $T_4$, the A code ($prf_3$) and B code ($prf_4$) target returns will be received at processing channel 78, the B code ($prf_2$) and A code ($prf_3$) target returns will be received at processing channel 80, and any additional target returns will be directed to the appropriate processing channel 78 or 80. As additional target returns from targets I and II are received and processed, the accuracy of range, speed and other information will improve.

An example of a pulse-compression MTI doppler radar system is an S-band search radar operating at 3000

MHz and a prf of 327 Hz which corresponds to an unambiguous range of 250 nautical miles. The first blind speed is 32 knots. If the clutter is spread over 15 knots there is no clear area for targets to be detected. However, if one triples the *prf* by using three coded channels there are 60 knot intervals in which targets can be seen and there are no range ambiguities until one reaches 250 nautical miles.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. In a pulse-compression MTI doppler radar system including an antenna, a coded modulator having at least two waveform generators for generating coded pulses having low cross-correlation, a transmitter, a receiver, and a display, the improvements comprising:
    a pulse-compression filter, connected to receive the output of said receiver, having at least two pulse compressors for providing pulse-compressed signals, each pulse compressor matched autocorrelatively to a different one of said waveform generators;
    at least two MTI processing channels for providing unambiguous range and speed indications to said display; and
    a multiplexer connected to receive the outputs of said pulse compressors for directing said pulse-compressed outputs to said MTI processing channels.

2. The apparatus of claim 1 in which said coded modulator includes a prf generator, and a second multiplexer connecting said prf generator to said waveform generators.

3. The apparatus of claim 1 in which said pulse compressors are connected in parallel to said receiver.

* * * * *